Aug. 28, 1945.  C. LUCKHAUPT  2,383,504
METHOD OF TREATING TIMBER
Filed Dec. 4, 1941  2 Sheets-Sheet 2
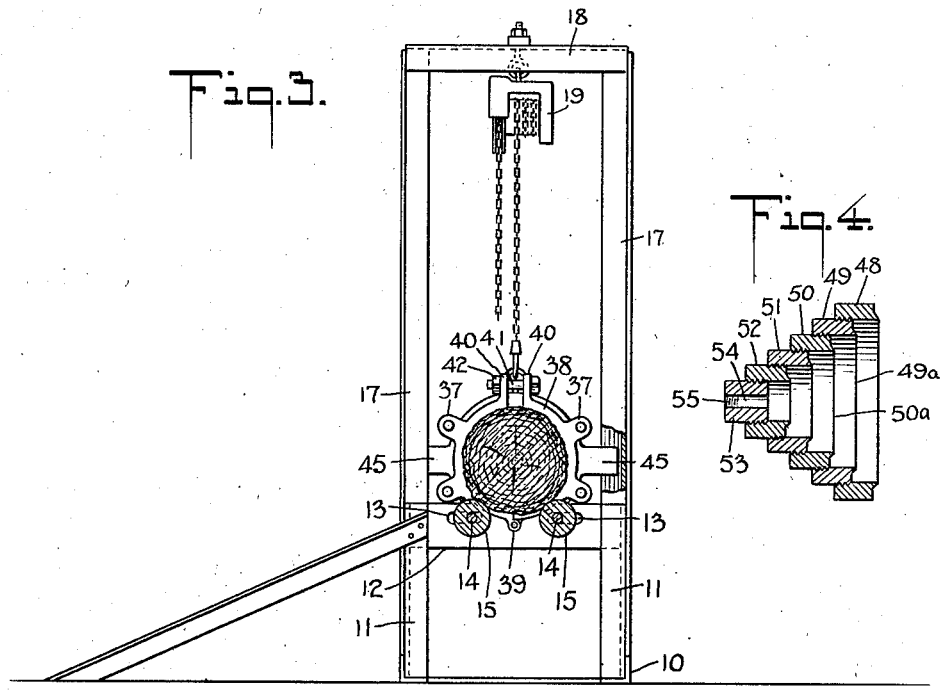
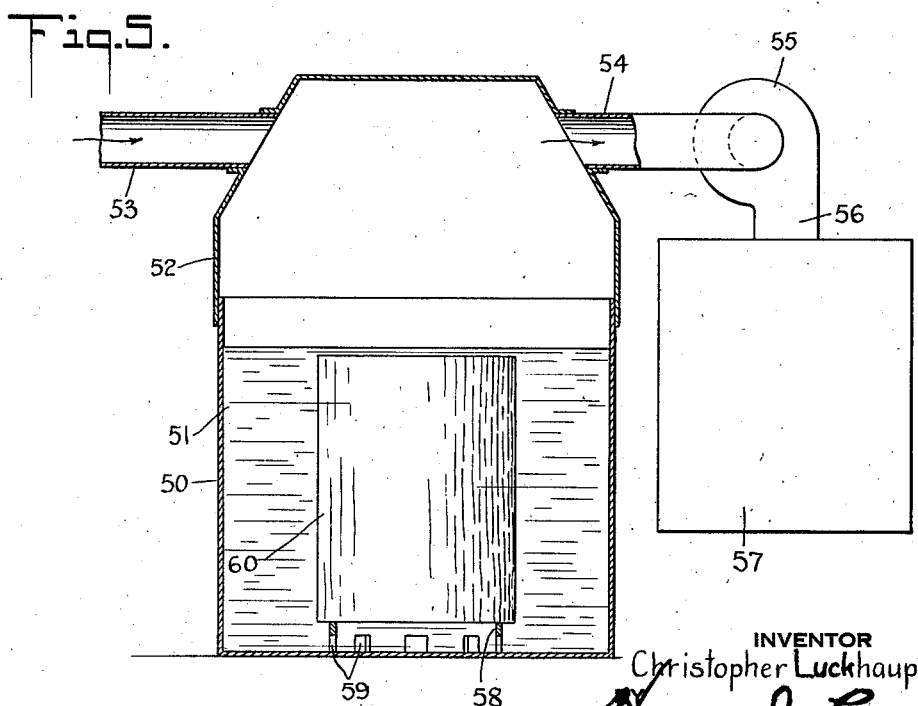
INVENTOR
Christopher Luckhaupt
HIS ATTORNEY Patented Aug. 28, 1945

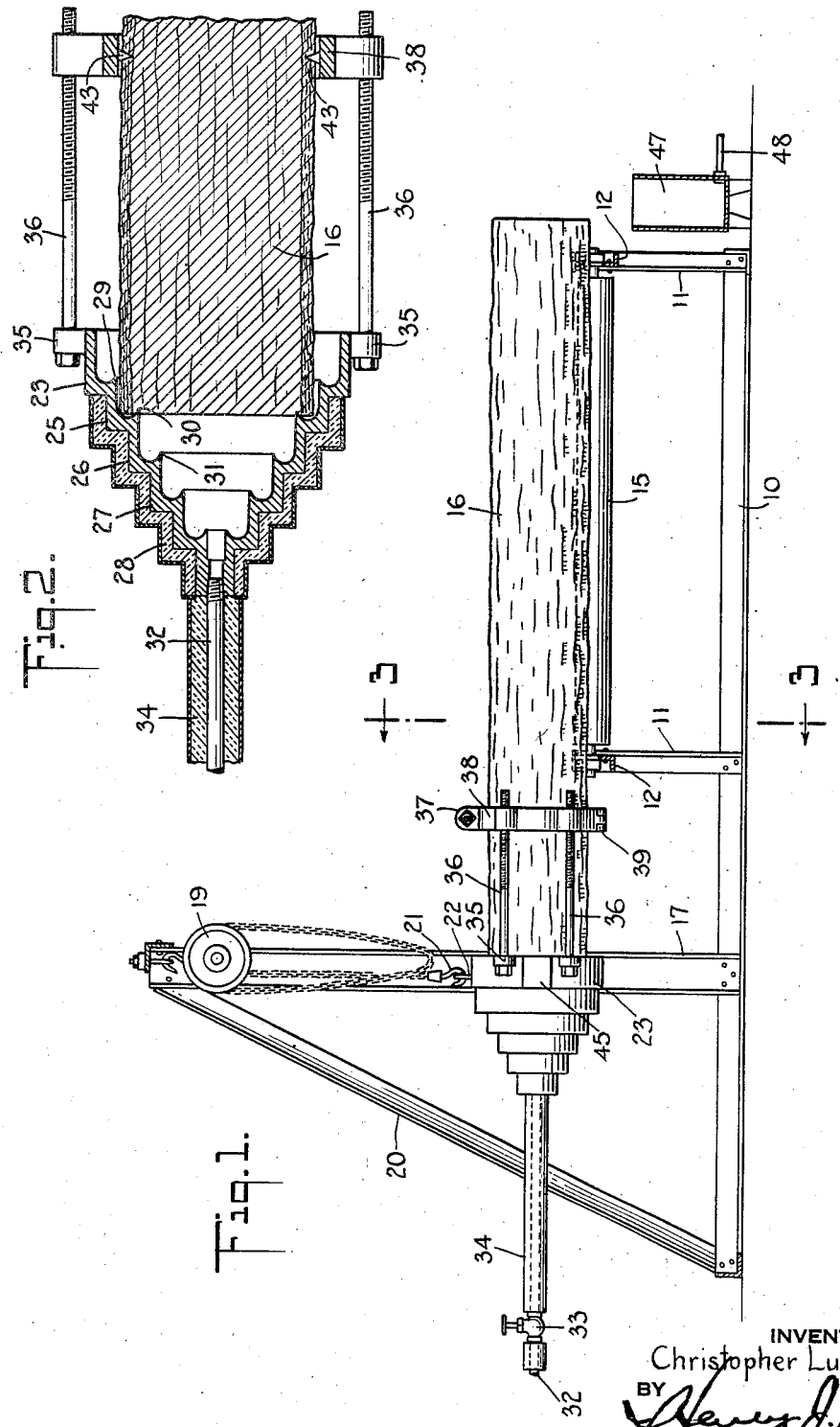

2,383,504

UNITED STATES PATENT OFFICE 2,383,504

METHOD OF TREATING TIMBER

Christopher Luckhaupt, Jamaica, N. Y., assignor to Henry J. Lucke, East Orange, N. J.

Application December 4, 1941, Serial No. 421,568

4 Claims. (Cl. 117—59)

My present invention relates to the treatment of lumber and more particularly an improved method for treating green lumber.

Generally, the invention relates to the treatment of wood or like cellulosic material with terpin hydrate, either alone or combined with certain fortifiers or other treatment material as set forth more particularly hereafter for imparting new or enhanced qualities to such treated material by subjecting such treated material to elevated temperatures in advance of the terpin hydrate or other treatment material. Preferably, such increased temperature is attained by gradual stages of increase, and desirably to a final pre-heated temperature substantially that of the terpin hydrate or other treatment material.

The treated material such as natural wood and the like is insoluble in the terpin hydrate or other treatment material.

The invention comprises also the treatment of wood or like cellulosic material with treatment material such as phenol resins, urea resins, asphaltum, tar, creosote and the like, employing as vehicle solvents, water emulsifications and the like.

In the instance of green lumber, optimum results are attained by the removal of all or substantial portion of the free water, largely contained in the sap passages of the wood structure, in advance of the stated treatment stage. Such removal may be accomplished by compressed air, but preferably by steam at a temperature range insuring minimum aqueous condensation, followed promptly by the pressure flow of the heated terpin hydrate or other treatment material in fluid status. Heated compressed air may be employed in lieu of steam.

The invention may be applied to wood in log form by forcing therethrough heated treating material, such as terpin hydrate or other treatment material at a temperature at or above 115° C., under pressure longitudinally of the log. Fortifiers with or without dyes or coloring matter may advantageously be admixed with the terpin hydrate or other treatment material, whereby the terpin hydrate or other treatment material under the imparted pressure forces out not only all excess moisture, thus rendering the wood practically kiln-dry, but also simultaneously impregnates the entire log with the treating material.

Accordingly, under the stated preliminary steam or heated compressed air treatment followed by the stated terpin hydrate treatment at a temperature at or above 115° C., conversion into steam of the moisture content of the wood ensues, with consequent generated pressure enhanced by the pressure of the stated preliminary and subsequent terpin hydrate treatments.

An object of the invention is an improved method for treating green lumber.

A feature of the invention is an improved method of treating green lumber to render the same warp-proof and to lessen the danger of shrinking.

A further feature of the invention is an improved method of imparting to lumber an enhanced finish without injury to the characteristics of the wood itself.

A further feature of the invention is an improved method of treating lumber in the green state to remove excess moisture therefrom and to impregnate the same with a coloring matter.

In the accompanying drawings:

Fig. 1 is a side elevation of an embodiment of apparatus typical for practicing the invention upon wood in log form.

Fig. 2 is a fragmentary vertical sectional elevation of Fig. 1.

Fig. 3 is an end elevation taken on the line 3—3 of Fig. 1, looking in the direction of the indicating arrows.

Fig. 4 is a detail central sectional view of another form of device for securing one end of a log to the treating material apparatus; and Fig. 5 is an elevation, partly in central vertical section, of another embodiment for treating wood, including green wood.

Referring to the drawings, the illustrated structures afford the application of the method comprising the removal of free water from green lumber, as in log form, by the use of steam, including superheated steam under pressure viz, at a temperature of at least 115° C., by injecting such steam through the log from one end. Preferably, injecting such steam from the butt end of the log is usually more efficient. The pressure of such steam preferably does not exceed 50 pounds although any desired pressure may be used. Under certain circumstances, the use of air, preferably hot, forced under pressure longitudinally of the log may be employed to force out the excess moisture.

If desired, color, such as any dye suitable for dyeing wood and soluble in water, or water emulsions or other solvent vehicles, may be injected by way of pressure and passed from one end of the log to the other, until a steady stream of liquid dye discharges from the further end, and until the desired depth of color is obtained. After the lumber is dyed, preferably at as high a temperature as possible, air or steam or superheated air or steam is injected and blown through the log to remove free water caused by the dyeing operation.

The method contemplates the use of terpin hydrate or other stated treatment material, both for the purpose of removing water from the log and also as a carrier for any coloring matter that may be desired. To effect said operations, the terpin hydrate or other stated treatment material is heated to liquid form to which coloring matter is added and pressure forced through the log from one end to the other. During these operations the terpin hydrate or other stated treatment material drives out all excess water within the green log; upon cooling, the terpin hydrate or other stated treatment material forms a solid with the cellulosic material and is retained within the cellular structure of the wood. The temperature above the melting point of the terpin hydrate, viz., 115° C. is usually employed to liquify the terpin hydrate treatment material and the pressure may vary from five to fifty pounds or upwardly per square inch.

The stated treatment employing materials such as phenol resins, urea resins, asphaltum, tar, creosote; and the like, employing as a vehicle water or other solvents, and the like, is expedited in rapidity of treatment period, and the resulting product enhanced in the imparted characteristics, by increasing the temperature of the treatment material definitely above atmospheric temperatures, and preferably in the range from 50° C. to 80° C. for alcoholic solvents or emulsions, or from 80° C. to 100° C., and even above to say 110° C. for less volatile solvents or emulsions.

The log to be operated on is preferably treated with the bark thereon, thus serving as an enveloping conduit. The log is positioned in a device such as shown in the drawings, wherein 10 designates a base having at one end vertically spaced uprights 11 connected at their top ends by transverse members 12 and in which transverse members are elongated openings 13, see Fig. 3, which act as bearings for the shafts 14, on which shafts are mounted the rollers 15. The rollers 15 are arranged parallel to and spaced apart from each other, and the distance between the same may be varied in accordance with the length of the slots 13. The rollers 15, therefore, provide a cradle on which may be readily rotated a log, such as the indicated log 16. At the other end of the base members 10 are the spaced uprights 17 connected at their top ends by a transverse member 18, from which is hung a chain hoist 19. The uprights 17 are braced by members 20 connected at one end to the base members 10 and at their other ends to the upper portions of the uprights 17.

The chain hoist 19 is provided with a hook 21 which passes through an eye 22 secured to a member 23. The member 23 is of staggered circular formation, being provided with a plurality of circular stepped portions 25, 26, 27, etc., see Fig. 2, each succeeding stepped portion being of progressively lesser diameter; the major portion of the member 23 is encased in a cover by a heat conserving material 28.

The interior of the member 23 is hollow and is provided with a plurality of circular knife edges 29, 30, 31, etc., there being one knife edge for each step on the effective face of the same. Thus, each succeeding knife edge is of progressively lesser diameter in conformity with the successive steps 25, 26, 27, etc., above referred to. The reduced end of the member 23 is drilled and tapped to receive the threaded end of a pipe 32 which leads to any suitable source of air, steam or heated terpin hydrate treating fluid, under pressure flow. Such air, steam or heated terpin hydrate or other stated treating fluid, under pressure flow passes through a valve 33 interposed intermediate the ends of the pipe 32 for controlling the flow of said material therethrough. Said pipe 32 is lagged as indicated at 34 to conserve the heat of the material passing therethrough. The larger end of the member 23 is provided with a plurality of lugs 35 spaced about the periphery of the member 23 and extending therethrough are the bolts 36.

The member 23 is also provided with diametrically arranged extensions 45 which slidably engage with the uprights 17, which may be of suitable metal, and thus the member 23 and its associated parts, as well as the log 16, is constrained to move vertically upward or downward. The nearer upright 17 has been omitted from Fig. 1 for the sake of clarity.

The threaded end of the bolts 36 screw into threaded lugs 37 carried by a split ring 38. Said split ring 38 is shown provided with a hinge 39 and diametrically opposite thereto with clamping lugs 40, through which extends a bolt 41 secured on its threaded end by a nut 42. The split ring 38 is provided in its inner face with inwardly projecting pins 43, see Fig. 2, serving to bite into the bark of the log 16.

In the employment of the above assembly, the log 15 is placed on the rollers 15 and moved into engagement with the member 23. The log 16 is driven endwise, as to the left as viewed in Fig. 1, in order to seat the correct ring knife 29, 30, 31, etc., according to the mean diameter of the log, into the surface of the butt end of the log. The ring 38 is then placed into position about the log, the nut 42 screwed onto the bolt 41 to clamp the same firmly around the log, thereby causing the pins 43 to bite into the log. The bolts 36 are then drawn to hold the log firmly into engagement with the effective ring knife.

At the end of the frame member 10 and adjacent the log 16 may be placed a tank 47 for catching the treating liquid flowing out of the discharge end of the log, and such tank 47 may be provided with a pipe 48 for conducting such liquid to any suitable storage.

Another embodiment of the device above described is shown in Fig. 4. The illustrated member adapted to fit onto the end of a log 16 may be substituted for the above described structure 23 shown in Fig. 2. The structure of Fig. 4 comprises a plurality of concentric rings 48, 49, 50, 51 and 52, each provided with an internal thread at one end, an external thread at the other, and with circular knife edges 49a, 50a, etc., at the exposed ends of which are outside threads. The ring 49 is screwed into the ring 48, the ring 50 into the ring 49 and so on. Into the ring 52 is screwed one end of a coupling 53, said coupling being provided with a bore 54 which, in turn, is internally threaded at 55 to connect with a pipe, such as the pipe 32 in Figs. 1 and 2 and for the same purpose as above set out.

Fig. 5 shows another suitable typical apparatus and illustrates a method of treating wood pursuant to the invention. Such apparatus may comprise a tank 50 in which may be placed the selected terpin hydrate or other stated treatment material 51 and is shown provided with a canopy or hood 52. Connected with the hood 52 is a pipe 53 through which air may pass into the hood 52. Connected to the canopy or hood 52 is a pipe 54 provided at or adjacent its discharge end with a blower 55 having an outlet 56 which is connected to a receiving chamber 57.

Within the tank 50 is a support 58 upon which may be placed the to-be-treated lumber or other portion of wood 60. The support 58 is provided with apertures 59 to allow the entrance of treatment material to the under end of the wood. The upper end of the wood 60 when immersed may be disposed adjacent to but slightly below the upper surface of the terpin hydrate or other stated treatment material 51. The terpin hydrate or other stated treatment material, either alone or admixed with fortifier or with or without coloring material, as above described, is placed in the tank 51 and rendered to liquid form by heat to the desired degree of temperature, as preferred.

The wood 60 is first supported in any suitable manner under the hood 52 as to one procedure for pre-heating the same, and preferably to the temperature of the bath 51. This step is of especial advantage in the treatment of green wood. Thus the temperature of the cellulose structure of the green wood and its contained water and moisture, is gradually raised, a certain portion of which passes off in the form of steam, which is disposed of as by being drawn off by the suction blower 55.

Having thus pre-heated the wood and removed a substantial portion of its water content, the wood is then lowered into the stated position onto the support 58. Fully submerged now within the treating material at a temperature at or above 115° C., the remaining water content (excepting that combining with the terpin hydrate or other stated treatment material) is forced under the pressure head bath 51 within the cells of the wood 60 passes upwardly through the passages of the wood and finally discharged from the treated wood. Such preliminary pre-heating treatment engenders the formation of steam under pressure within the body of the cellulose structure, which pressure is enhanced by the subsequent terpin hydrate treatment at 115° C. or upwardly.

Reference is made to my co-pending application executed November 7, 1941, and entitled Method of treating cellulosic materials and resulting product, filed December 4, 1941, and bearing Serial No. 421,569, wherein is set forth the procedure generally of controlling the density of the resultant treated cellulosic material either by increasing the density either uniformly or non-uniformly as by subjecting the treated porous cellulosic material to uniform or non-uniform compression and/or the addition of an ingredient to the terpin hydrate treatment material for decreasing the density of the resultant product.

Whereas I have described my invention by reference to specific forms thereof, it will be understood that many changes and modifications may be made without departing from the spirit of the invention.

I claim:

1. The method of treating wood or like cellular material embodying free water content which comprises reducing the free water content by simultaneously applying pressure at an end of the treated material affording passage therethrough of the pressure medium while preheating such material to a temperature at or above 115° C., thereby creating steam under pressure within the treated material, and thereafter subjecting the treated material while thus preheated to terpin hydrate treating material at or above 115° C., whereby the thus supplied terpin hydrate constituent chemically combines with residual water content of the treated material to form solid composition filling the voids of the treated material.

2. The method of treating wood or like cellular material embodying free water content which comprises reducing the free water content by simultaneously applying steam under pressure at or above 115° C. at an end of such material affording passage therethrough of the steam thereby preheating the treated material and simultaneously converting a portion of such free water content to steam under pressure, and thereafter subjecting the treated material while thus preheated to terpin hydrate treating material at or above 115° C., whereby the thus supplied terpin hydrate constituent chemically combines with residual water content of the treated material to form solid composition filling the voids of the treated material.

3. The method of treating wood or like cellular material embodying free water content which comprises reducing the free water content by simultaneously applying pressure at an end of the treated material affording passage therethrough of the pressure medium while preheating such material to a temperature at or above 115° C., thereby creating steam under pressure within the treated material, and thereafter subjecting the treated material while thus preheated to terpin hydrate treating material under positive pressure at or above 115° C., whereby the thus supplied terpin hydrate constituent chemically combines with residual water content of the treated material to form solid composition filling the voids of the treated material.

4. The method of treating wood or like cellular material embodying free water content which comprises reducing the free water content by simultaneously applying steam under pressure at or above 115° C. at an end of such material affording passage therethrough of the steam thereby preheating the treated material and simultaneously converting a portion of such free water content to steam under pressure, and thereafter subjecting the treated material while thus preheated to terpin hydrate treating material under positive pressure at or above 115° C., whereby the thus supplied terpin hydrate constituent chemically combines with residual water content of the treated material to form solid composition filling the voids of the treated material.

CHRISTOPHER LUCKHAUPT.